United States Patent [19]
Murphy

[11] Patent Number: 5,128,970
[45] Date of Patent: Jul. 7, 1992

[54] NON-RETURN TO ZERO SYNCHRONIZER

[75] Inventor: Philip A. Murphy, King of Prussia, Pa.

[73] Assignee: UNISYS Corporation, Plymouth Meeting, Pa.

[21] Appl. No.: 630,868

[22] Filed: Dec. 20, 1990

[51] Int. Cl.⁵ .............................................. H04L 7/00
[52] U.S. Cl. .................................... 375/106; 375/119; 307/269
[58] Field of Search ............... 375/106, 117, 118, 119; 371/47.1; 307/272.2, 272.3, 269, 262

[56] References Cited

U.S. PATENT DOCUMENTS

| | | | |
|---|---|---|---|
| 4,498,176 | 2/1985 | Wagner | 371/47.1 |
| 4,569,062 | 2/1986 | Dellande et al. | 375/117 |
| 4,576,797 | 3/1986 | Satoh et al. | 375/117 |
| 4,586,189 | 4/1986 | Tyrrell | 375/117 |
| 4,596,026 | 6/1986 | Cease et al. | 375/118 |
| 4,615,017 | 9/1986 | Finlay et al. | 364/900 |
| 4,740,998 | 4/1988 | House | 375/118 |
| 4,745,530 | 5/1988 | Hanawa et al. | 307/269 |
| 4,926,445 | 5/1990 | Robb | 375/106 |
| 4,935,942 | 6/1990 | Hawang et al. | 375/106 |
| 4,949,360 | 8/1990 | Martin | 375/106 |

Primary Examiner—Benedict V. Safourek
Assistant Examiner—Young T. Tse
Attorney, Agent, or Firm—Ratner & Prestia

[57] ABSTRACT

A non-return-to-zero synchronizer is described which creates an output pulse signal that is synchronized to a system clock signal, from an asynchronous input strobe signal which can occur at any point in a given system clock cycle. The first circuit element within the synchronizer captures the input strobe and toggles the state of its data output terminal in response to successive pulses of the asynchronous input strobe signal. The remaining portion of the synchronizer responds to each change in the state of the first circuit element and to produce an output pulse having a duration of one clock cycle. An alternative embodiment is described which utilizes a sequential logic circuit to generate the desired output pulse. Because the synchronizer uses a state change to indicate the occurrence of a strobe, the problem of resetting the initial circuit element to a particular logic level is eliminated.

8 Claims, 5 Drawing Sheets

NON-RETURN TO ZERO SYNCHRONIZER

FIELD OF THE INVENTION

The present invention relates to synchronous data processing systems in general and in particular to a circuit for converting an asynchronous strobe signal into a pulse which is synchronous with the system clock of a data processing system.

BACKGROUND OF THE INVENTION

In data processing systems the need arises to transfer data across the system boundaries. For example, transfers between a slower I/O device and the processor system bus often involve re-synchronizing the I/O data with the system clock prior to storage in memory. It is common in the art for data from the I/O device to be accompanied by a strobe signal for each new data word. This strobe signal can occur every few cycles of the system clock signal, and is desirably converted into a signal which changes state coincident with the system clock signal. Synchronizing circuits have been developed to accommodate this need.

U.S. Pat. No. 4,745,302 to Hanawa et al. discloses a synchronizer in which four level-sensitive latches are used to synchronize an external signal to the internal clock in one-fourth of a clock cycle. A primary clock signal is divided into two secondary clock signals and the four latches are clocked by different ones of the secondary and complemented secondary clock signals. Since it is clocked, this circuit may miss a strobe which occurs between clock pulses.

U.S. Pat. No. 4,615,017 to Finlay et al. relates to a memory interface circuit that couples a memory to either a synchronous bus or an asynchronous bus. In this system, an asynchronous memory access request signal is latched using the local memory clock signal. A data transfer acknowledge signal is derived from the synchronized memory access request signal. As with the circuit disclosed in Hanawa, proper synchronization only occurs when the data input signals to the latch are stable prior to the arrival of the clock signal. A data strobe pulse having a short duration relative to the period of the system clock signal could be missed.

Figures 1A, 1B:
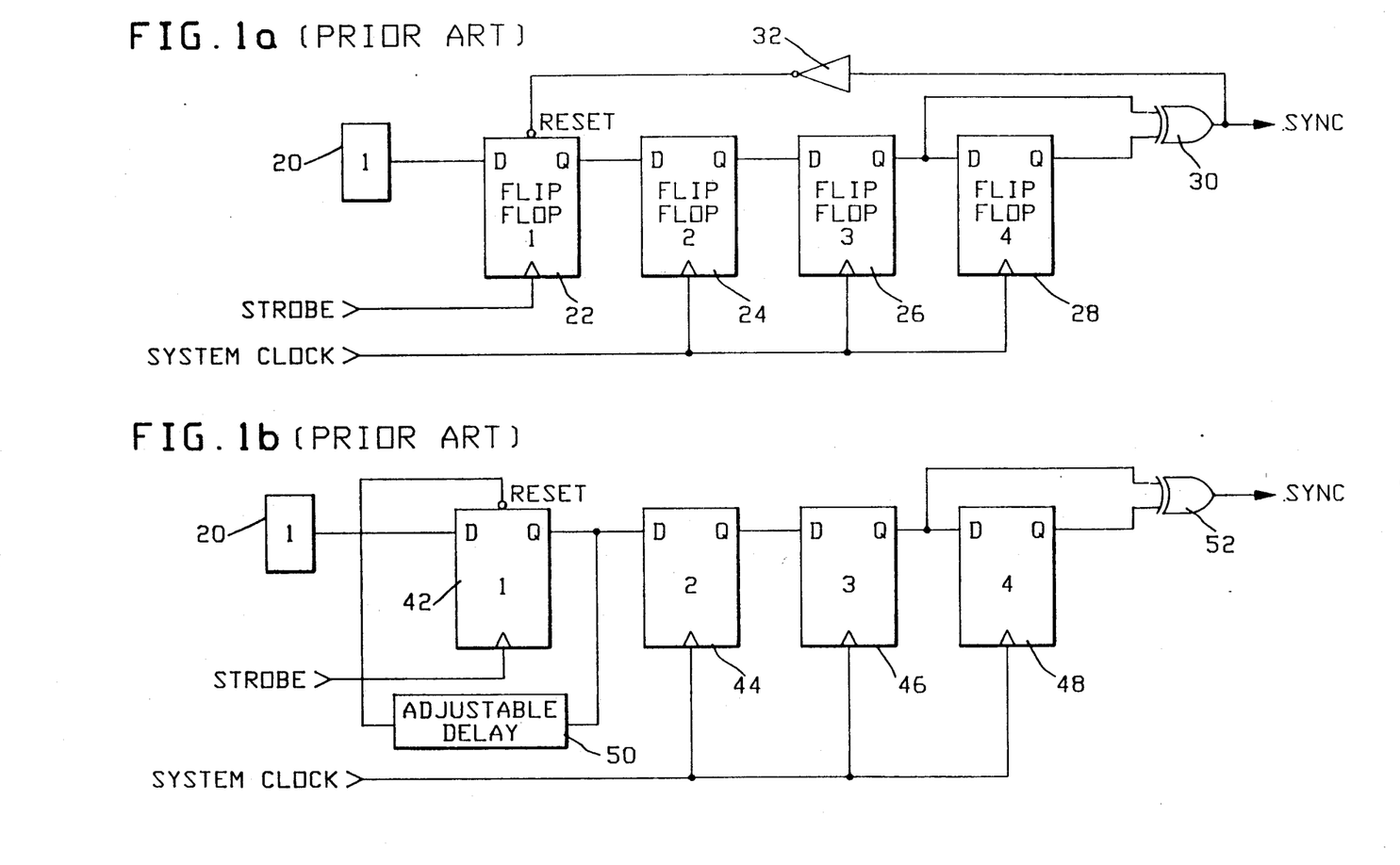
FIG. 1a is a logic schematic of a prior art synchronizer circuit.
FIG. 1b is a logic schematic of a second prior art synchronizer circuit.

FIGS. 1a and 1b show synchronizing circuits suitable for synchronizing short input pulses. Each circuit uses a series of flip flops to acquire an asynchronous input strobe signal and produce an output pulse that is synchronized to the system clock signal. The initial flip flop 22 in the series uses the positive-going edge of the asynchronous signal STROBE to propagate a logic high level from a source of logic high 20 to its Q output terminal. After some delay, the flip flop 22 is cleared to a logic low level through a pulse signal applied to an asynchronous reset terminal, to await the arrival of the next asynchronous strobe pulse.

A low to high logic transition of the signal provided by output terminal Q of the flip flop 22 indicates that an asynchronous input strobe has been received by the circuit. A disadvantage of using the low to high state transition in this manner is that the first stage flip flop must be reset between pulses.

In FIG. 1a, the reset signal is obtained from the re-clocked version of the input strobe. When the asynchronous input strobe signal is asserted, the flip flop 22 changes the state of its output from low to high. The input terminal D of flip flop 24 is coupled to the output terminal of flip flop 22. A data bit present on the output terminal of flip flop 22 is captured by the flip flop 24 responsive to the system clock signal. This data bit then appears at the output terminal Q of the second flip flop 24.

Since the input signal to the second flip flop is asynchronous to the system clock signal, the second flip flop's output signal may be metastable. That is, if the required input signal setup time is not met, the output signal may oscillate between logic low and logic high. It settles eventually to a recognized state, but to compensate for the possible metastability, a third flip flop stage 26 must be used to ensure that a stable synchronization pulse is produced.

The input terminal D of the flip flop 28 is coupled to data output terminal Q of the flip flop 26. Responsive to the system clock signal, the flip flop 28 captures data applied to its D input terminal and places it on the Q output terminal. An output pulse signal SYNC is formed by applying the data output signals from flip flop 26 and flip flop 28 to an exclusive-OR gate 30. In the circuit implementation shown in FIG. 1a, this output signal SYNC is then fed back through an inverter 32 to the asynchronous reset input terminal on the flip flop 22. It is in response to this signal that the flip flop 22 resets its output signal to a low logic level, to prepare for the next input strobe pulse. A problem with this implementation is that the frequency of the clock signal must be high relative to the period between strobes. If the frequency of the system clock is too low, then the first flip flop may be in the process of resetting itself when the next asynchronous input strobe is received.

In FIG. 1b, the output signal Q of the first flip flop 42 is fed back through an adjustable delay line 50. The delayed signal is then applied to the asynchronous reset input terminal of the flip flop 42. The adjustable delay line is programmable to provide one of several possible delay times to the signal provided to its input terminal. This has the disadvantage of requiring an expensive extra component and its required board space. In addition, two extra input pins to the synchronizer integrated circuit may be required for interconnection to the adjustable delay line component.

The output stage of each of the two prior art synchronizing circuits includes an exclusive-OR gate. As set forth above, the input signals provided to this gate are the output signals from the third and fourth flip flops in each circuit, respectively. The SYNC output signal thus produced by the exclusive-OR gate is an active high pulse, one clock cycle in duration.

However, the propagation delay through the exclusive-OR gate, on the order of several nanoseconds (ns), imposes a penalty on system performance. The resulting SYNC output signal is not available until later in the clock cycle, and its worst case delay time is increased. Further, this implementation is capable of producing an output pulse only once every three system clock cycles.

SUMMARY OF THE INVENTION

Figure 2:
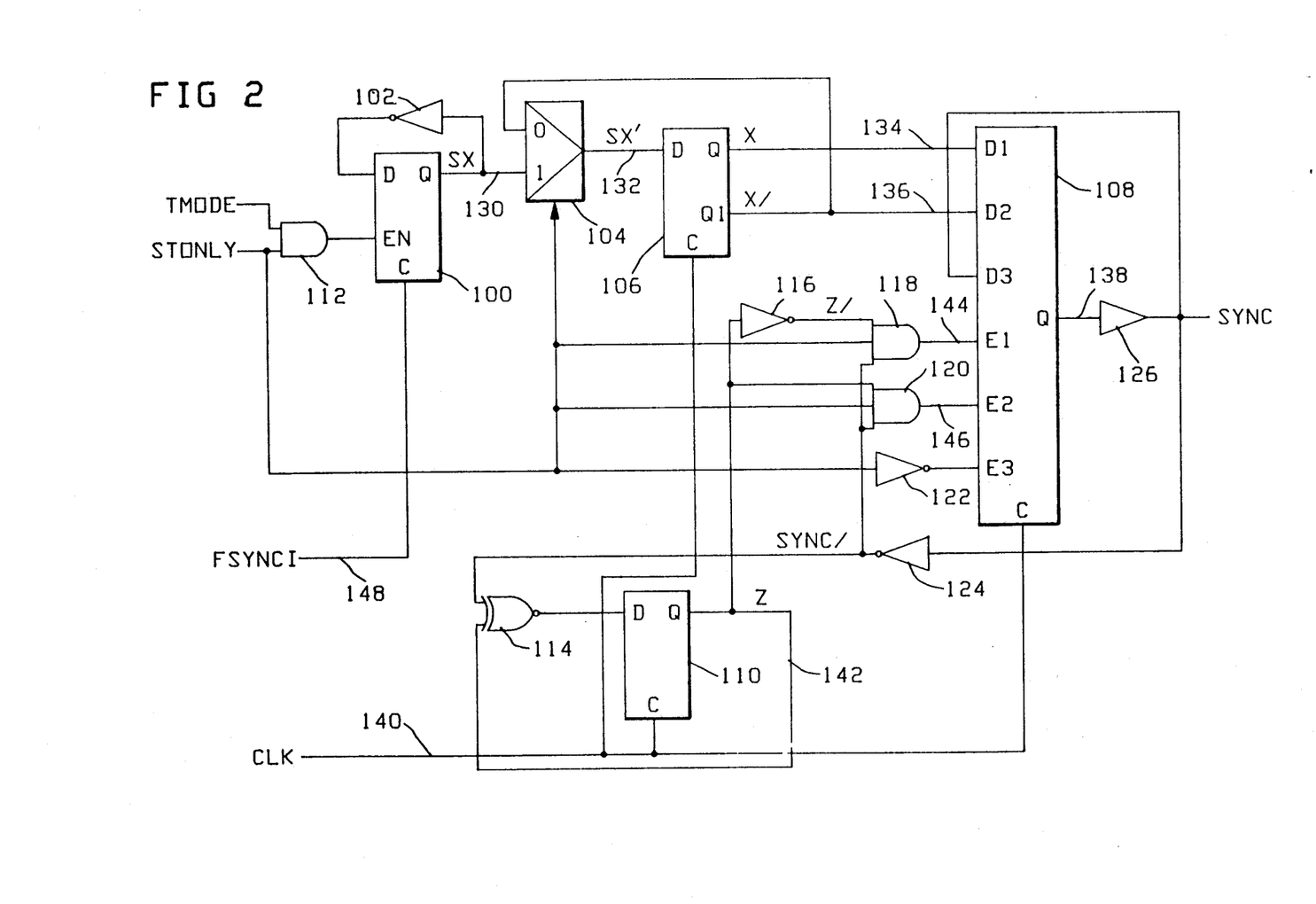
FIG. 2 is a logic schematic diagram of an exemplary embodiment of an Non-Return-to-Zero (NRZ) synchronizer circuit according to the present invention.

The present invention is embodied in an NRZ synchronizer circuit, shown in FIG. 2, which synchronizes an asynchronous input strobe signal FSYNCI with a system clock signal CLK. In the exemplary embodiment, CLK is a periodic signal having a single frequency within the range 24 Megahertz to 32 Megahertz. FSYNCI is a signal with a low-to-high transition occurring every 90 ns.

The name non-return-to-zero (NRZ) synchronizer, refers to the property of the circuit in which the logic level transitions of the first circuit element signify the occurrence of the asynchronous input strobe. The remaining circuit elements then react to the transitions of the first circuit element to produce the desired output signal. This is analogous to the NRZ data format, in which logic transitions (or lack of logic transitions) on a signal line indicate the presence of logic high (or logic low) level data bits on that signal line.

In a synchronizer circuit according to the present invention, the need to reset the first stage flip flop is eliminated. Asynchronous input strobes are converted to a state change of the output signal of the first flip flop. Each state change of the first flip flop is converted to the desired synchronization pulse. This eliminates the asynchronous reset input terminal on the first flip flop and extra components used to synchronize signals in a data processing system which has varying clock frequencies.

DETAILED DESCRIPTION

FIG. 2 illustrates an exemplary embodiment of an NRZ synchronizer circuit. Flip flops 100, 106, 108, and 110 are latch circuits each of which transmits input data D to an output terminal Q when a control signal C is asserted, that is, when C is at a logic high level. When the control signal is negated, the signal at output terminal Q is held constant. C is also referred to herein as the clock input terminal of the flip flop. This type of latch circuit is commonly referred to as a leading-edge triggered flip flop. It is contemplated that the present invention may be implemented by using negative-edge triggered flip flops also.

The signal FSYNCI is a periodic pulse which is to be synchronized to the system clock signal CLK. In this embodiment of the invention, a pulse of the signal FSYNCI occurs, at most, every 90 ns, and the frequency of the system clock signal CLK can vary from 24 Megahertz to 32 Megahertz. FSYNCI is provided to the clock input terminal of flip flop 100. Flip flop 100 is configured to toggle (i.e., change state) with each low to high transition of the signal FSYNCI. Accordingly, the output signal SX of flip flop 100 is fed back through inverter 102 to the data input terminal D.

The signal SX is provided to a first input data terminal of multiplexer 104. A second input signal to multiplexer 104 is provided by the next flip flop 106 in the series. After the system is initialized, the signal SX is selected as the output signal SX' the multiplexer 104. This signal is provided to the flip flop 106.

Flip flop 106 is a potentially metastable flip flop. That is, since its input signal SX' is not synchronized to the flip flop clock signal CLK, a condition may arise where the output signal X of flip flop 106 may reach an intermediate logic state, neither high nor low. This may occur when the signal SX' does not meet the required data setup time with respect to the clock signal. Therefore, in this embodiment of the invention, a flip flop with high metastability immunity is used for the flip flop 106. The desired characteristics of this flip flop include a short data setup time (e.g. 3.4 ns from input to clock), an extremely low failure rate, and resistance to output signal oscillations which may occur when input setup time is violated. A flip flop 106 having these lo characteristics quickly settles to a recognizable logic level even when setup time is violated.

Both the Q and the Q/ output terminals of the flip flop 106 are used in the exemplary embodiment. The second flip flop 106 is placed in close proximity to the next-stage flip flop 108 so that the signals X and X/ provided by the Q and Q/ output terminals of 106 traverse a minimal path. This allows the data signals applied to the flip flop 108 sufficient time to settle before they are captured.

The final stage of the NRZ synchronizer circuit consists of a three-input flip flop 108, several logic gates 114 through 124, and a fourth flip flop 110. This portion of the synchronizer circuit generates an output pulse SYNC which occurs early in the period of the clock signal CLK.

The output signal SYNC is available directly from the Q output terminal of the final stage flip flop 108. This has the advantage of producing a pulse which occurs as early as possible in the system clock cycle. This is advantageous because the synchronization pulse is likely to be subject to subsequent gating delays for use in applications such as clocking counters, loading shift registers, and other similar system timing functions.

Flip flop 108 obtains its data from one of three, alternately enabled data input terminals D1, D2, and D3. The data on the currently enabled data input terminal is transmitted to the single output terminal Q when the clock input signal is asserted. Enable input terminals E1, E2, and E3 are active high.

A signal Z, which is produced by flip flop 110, is used in shaping pulses of the output signal SYNC. The present state of signal Z determines which state of signal X is required to form the next output pulse. Signal Z toggles after each SYNC pulse signal is produced. For example, if signal Z is currently at a logic high state, and a SYNC pulse has just been produced, then the signal X/ is enabled at the data input terminal to flip flop 108. If signal Z is currently at a logic low state, and a SYNC pulse has been produced, then the signal X is enabled at the data input terminal of flip flop 108.

Data input terminal D1 is enabled by the signal E1 as follows:

$$E1 = SYNC/ \text{ AND } Z/$$

where SYNC/ and Z/ are the logical complements of signals SYNC and Z respectively. Data input terminal D2 is enabled by the signal E2 as follows:

$$E2 = SYNC/ \text{ and } Z$$

In the exemplary embodiment, the signal STONLY/ remains at a logic high level while the circuit is operating. The inverse of STONLY/ is provided to enable input terminal E3. Thus, in normal operation, data input signal D3 is never transmitted to the output terminal Q of flip flop 108. Accordingly, the signal 138 provided at output terminal Q is composed of portions of the signals provided to data input terminals D1 and D2. It is contemplated that a two-input flip flop (not shown) could be used in place of the three-input flip flop 10B shown in the exemplary embodiment. During time periods in which no enable is active, the SYNC signal is forced to a low state.

The output signal 138 from flip flop 108 is passed to a buffer 126, which produces the output signal SYNC. This buffer 126 provides additional drive capability for the SYNC output signal. The buffered signal is provided to the enabling circuitry, and to the synchronizer output terminal SYNC.

Figure 3A:
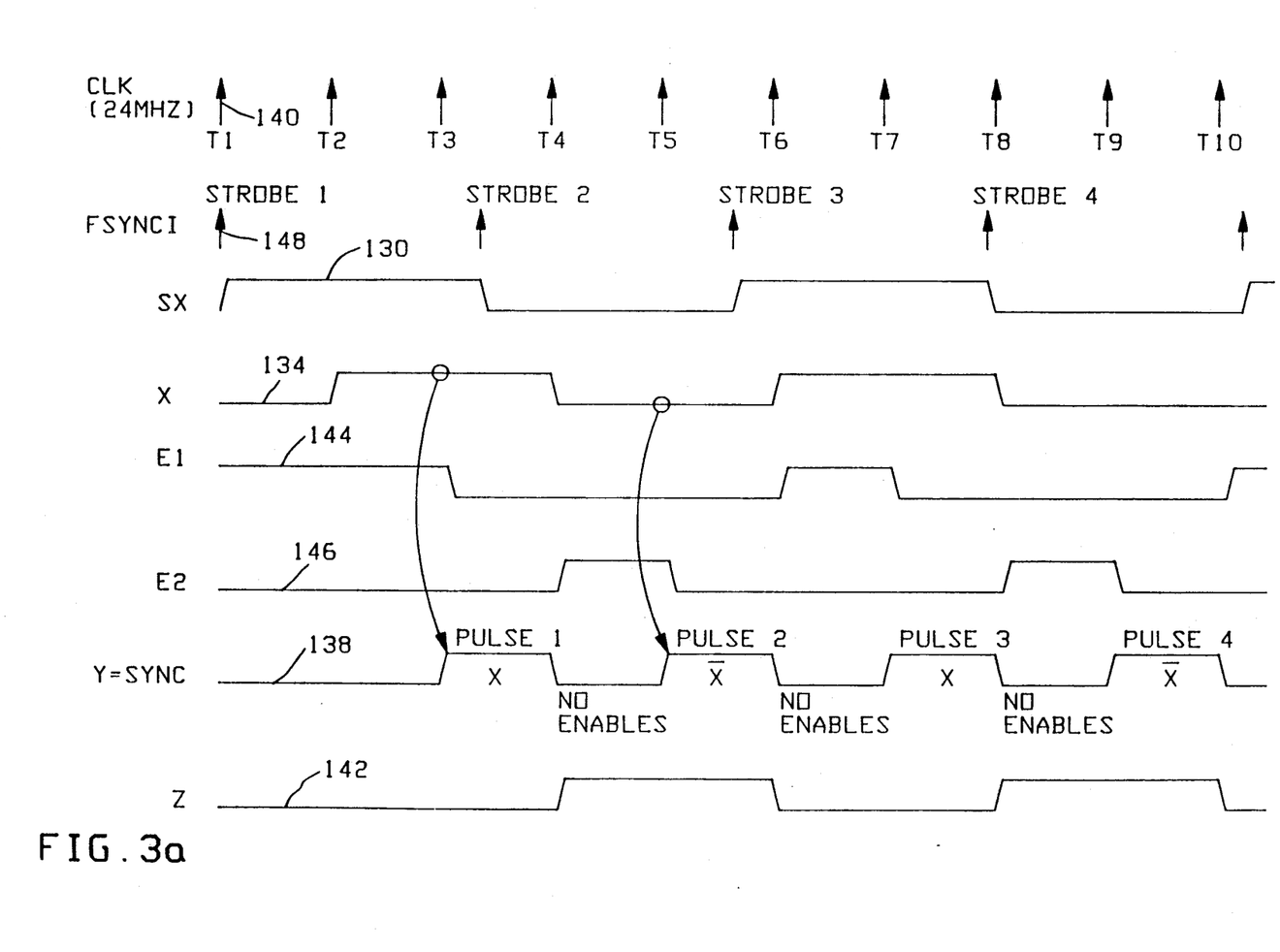
FIG. 3a is a timing diagram showing the relative timing of signals generated by the NRZ synchronizer circuit of FIG. 2 when the system clock signal has a period of approximately 40 ns.
Figure 3B:
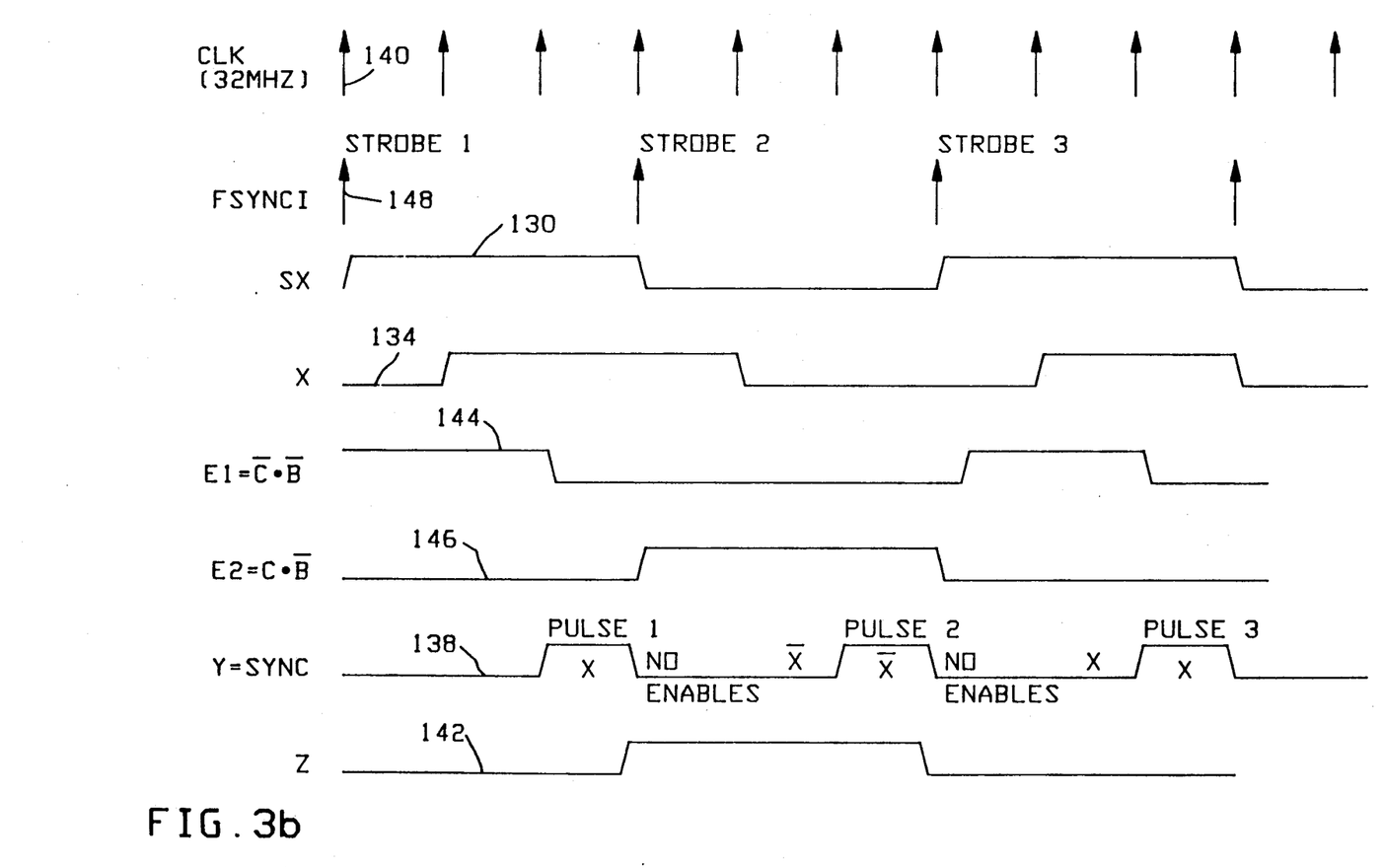
FIG. 3b is a timing diagram showing the relative timing of signals generated by the NRZ synchronizer circuit of FIG. 2 when the system clock signal has a period of approximately 32 ns.

FIGS. 3a and 3b are timing diagrams illustrating the waveforms produced within the NRZ synchronizer. FIG. 3a shows timing waveforms when the clock signal CLK has a period of approximately 40 ns. FIG. 3b illustrates the case where the signal CLK has a period of approximately 32 ns. In each timing diagram, the input signal FSYNCI has a low to high transition at 90 nanosecond intervals.

Referring to FIG. 3a, the input strobe signal FSYNCI 148 undergoes a transition from a logic low to a logic high level approximately at time TI plus a propagation delay time. This STROBE causes signal SX to go from its initial low state to a logic high state. Signal X goes to a high state at time T3. At this time, the enable signal E1 is active. Accordingly, the output signal SYNC goes to a high state for one clock cycle (PULSE 1). At time T4, no enables are active and the signal SYNC goes to a low state. This completes one cycle from the first input signal STROBE 1 to the first output signal PULSE 1.

A similar sequence of events occurs in response to the second pulse of the input strobe signal FSYNCI. STROBE 2 occurs at some time between T3 and T4. Flip flop 100 captures STROBE 2 and causes the signal SX to change to a logic low level. This state change of the signal SX is translated into an active high pulse, PULSE 2. PULSE 2 is produced at time T5, plus a small propagation delay time. Thus, with timing shown in FIG. 3a, it can be seen that the exemplary NRZ synchronizer can produce a synchronized output pulse as often as every other clock cycle.

FIG. 3b shows the case where the clock period is short (31 ns) with respect to the interval between input strobes. Each STROBE n is converted to a corresponding PULSE n. Between pulses, the signal SYNC remains low for two clock cycles. It is contemplated that the subject invention is suitable for use at even higher clock frequencies, limited only by the cumulative propagation delays through the longest path between flip flops 110 and 108. For lower clock frequency operation, however, the period of an asynchronous input strobe signal cannot be less than twice the period of the clock signal C.

It is contemplated that a modification may be made to the exemplary embodiment which is in accordance with the scope and spirit of the invention. An alternative embodiment is designed using a sequential logic circuit placed in series with flip flop 100 and flip flop 106. The output signal X from flip flop 106 is the input signal applied to the sequential logic circuit described below. By using the output signal from flip flop 106, the sequential logic circuit is assured a stable input signal.

Figure 4:
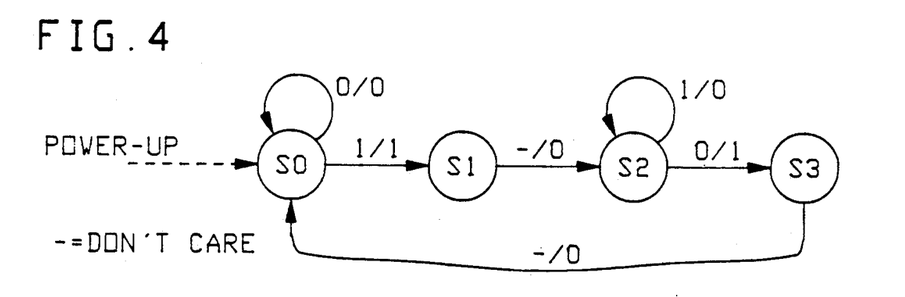
FIG. 4 is a state transition diagram of an alternative embodiment of the present invention.

As shown in FIG. 4, the alternative synchronizer undergoes transitions between four different states, denoted S0 through S3. The state of the synchronizer is stored in a two bit state register, consisting of two data flip flops, to which the system clock signal is applied. The output terminals of the state register, P1 and P0 denote present state. The input terminals N1 and N0 denote the next state, or the state which will become the present state after the occurrence of the next system clock signal. Transistions between states are determined by a combination of the present state signals and the input signal, X.

The state transitions are described below with reference to FIG. 4. State 0, or S0, is the initial state of the synchronizer. This state may be reached by using a power up reset circuit to initialize the state register flip flops. Thus, initially, the state register output terminals P1 and P0 are both at a logic low level. The circuit remains in State 0 until the input signal X changes to a logic high state. Then, at the next occurrence of the system clock signal, the state register changes to State 1, or S1, with P1 at a logic low level and P0 at a logic high level.

At the first system clock signal which occurs during State 1, the circuit undergoes a transition to State 2, without regard to the current state of the input signal X. In the state register, P1 is now at a logic low level, and P0 is at a logic high level. At the next occurrence of the system clock signal, if the input signal X is still at a logic high level, then the circuit remains in State 2 (S2). When the signal X becomes low, the circuit undergoes a transition to State 3 (S3) after the occurrence of the next clock signal.

At the first system clock signal which occurs while the circuit is in State 3, the circuit undergoes a transition back to State 0. Thus the synchronizer circuit is in its initial state, ready to respond to the next input signal X.

Table 1 shows the transition table for the embodiment described above.

TABLE 1

| | STATE TRANSITION TABLE NRZ SYNCHRONIZER | | | | | |
|---|---|---|---|---|---|---|
| Tn | P1 | P0 | X | N1 | N0 | SYNC |
| T1 | 0 | 0 | 0 | 0 | 0 | 0 |
| T2 | 0 | 0 | 1 | 0 | 1 | 1 |
| T3 | 0 | 1 | — | 1 | 0 | 0 |
| T4 | 1 | 0 | 1 | 1 | 0 | 0 |
| T5 | 1 | 0 | 0 | 1 | 1 | 1 |
| T6 | 1 | 1 | — | 0 | 0 | 0 |

— = don't care

From this table, it can be seen that the state variable N0 is identical to the desired output signal SYNC. Thus, the output signal SYNC is taken directly from the combinational logic gates which produce N0. Another flip flop may be placed in series with SYNC to smooth out transients in the signal N0 that may be caused by signals which change at different times with respect to the system clock signal. The resulting output signal has the same timing characteristics as the signal SYNC of FIG. 2, delayed by one clock cycle. As in the first exemplary embodiment set forth above, an output pulse one system clock cycle in duration is produced for each change in state of the initial flip flop 100.

Figure 5:
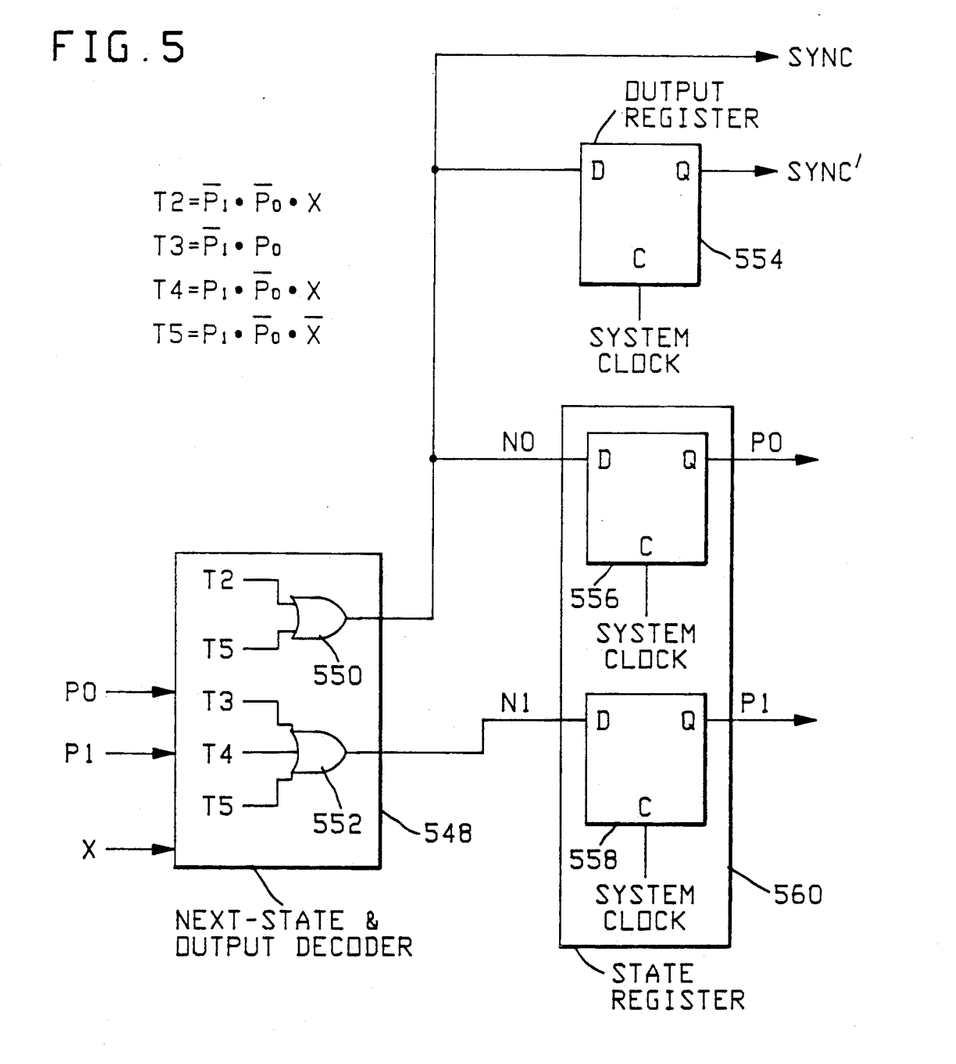
FIG. 5 is a logic diagram of an alternative embodiment of the present invention in accordance with the state transition diagram of FIG. 4.

FIG. 5 shows a circuit embodiment drawn from the state diagram and transition table discussed above. This circuit may be easily implemented in hardware by any one of a number of Programmable Array Logic devices (PALs), such as the 16R4, which are widely available.

The next state and output decoder 548 comprises an AND-OR logical gate array and a state register 560. The OR gates 550 and 552 produce the sum-of-products terms N0 and N1 which are described by the equations (1), (2), (3) and (4).

$$N0 = T2 + T5 \quad (1)$$

$$N1 = T3 + T4 + T5 \quad (2)$$

which may be expanded to:

$$N0 = (P1/ \text{ AND } P0/ \text{ AND } X) \text{ OR } (P1 \text{ AND } P0/ \text{ AND } X/) \quad (3)$$

$$N1 = (P1/ \text{ AND } P0) \text{ OR } (P1 \text{ AND } P0/) \quad (4)$$

The signals N0 and N1 are applied to the state register 560. The present state variables P0 and P1 are fed back from the output terminals of flip flops 556 and 558, respectively, to the next state and output decoder 548. The next state variable N0 is identical to the desired output signal, SYNC, as can be seen by comparing the signal N0 to the signal SYNC in Table 1. Thus the signal N0 may be used directly, or it may be reclocked in order to make it available earlier in the system clock cycle. FIG. 5 shows both options. SYNC' is the signal derived when the signal N0 is applied to the output register 554.

A further modification to the synchronizer is possible if the sequential logic circuit described above with reference to FIG. 5 is employed. It is likely that is some applications a flip flop which features high metastability immunity is not available for use. In this case, the input to the sequential logic circuit may be taken directly from the data output terminal of flip flop 100.

As set forth above, the output signal SX from flip flop 100 is known to be asynchronous to the system clock signal. However, even if a transition of the signal SX is not detected because of a setup time violation, the state register remains in the same state (either S0 or S2) for an extra cycle of the system clock signal. It cannot jump to the wrong state since there is a unit distance between state changes which involve the signal SX. That is, only the state bit P0 changes with each transition of the signal SX. So in the case of a setup time violation, the state register remains unchanged for an extra system clock cycle before changing to the next state.

While the invention has been described in terms of an exemplary embodiment and an alternative embodiment, it is contemplated that it may be practiced as outlined above with modifications within the spirit and scope of the appended claims.

The Invention Claimed is:

1. Apparatus, for use in synchronizing an asynchronous input signal to a periodic clock signal, comprising:
   a first latching element for detecting and capturing the asynchronous input signal, wherein said latching element is not reset to a fixed, initial state between occurrences of the asynchronous input signal and said latching element exhibits a change of state independent of said clock signal;
   a second latching element for synchronizing the output signal of said first latching element with the clock signal;
   gating means responsive to the output signal of the second latching element and to said clock signal for generating an output pulse signal having a duration not greater than one period of said clock signal from the output signal of said second latching element.

2. The apparatus set forth in claim 1, wherein:
   said asynchronous input signal is a pulse signal which occurs less than once during any two successive cycles of said periodic clock signal.

3. Apparatus, for use in synchronizing an asynchronous input signal to a known, a system clock signal, comprising:
   first latching means, having an internal state and being responsive to a predetermined transition of said asynchronous input signal for changing said internal state between first and second values and for providing said internal state as an output signal; and
   second latching means, coupled to receive said clock signal and having first and second data output terminals which provide respective normal and inverted signals for aligning the signal provided by said first latching means with the system clock signal;
   means, including multiple-input latching means, coupled to receive said clock signal and having at least first and second data input terminals coupled to the respective first and second data output terminals of said second latching means, for producing an active high output pulse one clock cycle in duration responsive to at least one of the normal and inverted signals provided by said second latching means.

4. The apparatus set forth in claim 3, wherein the means for producing said active high output pulse further comprises:
   a latching circuit means coupled to receive the active high output pulse and the system clock signal; and
   enabling circuitry means, coupled to the second latching means, for alternately enabling the multiple-input latching means to be responsive to one of the normal and inverted signals which are provided to the respective first and second input terminals of the multiple-input latching means.

5. The apparatus set forth in claim 3, wherein
   the second latching means is of a type having a relatively high metastability immunity and is placed in close proximity to the multiple-input latching means.

6. A method for synchronizing an asynchronous input strobe signal to a periodic clock signal, comprising the steps of:
   asynchronously capturing said input strobe signal using a first latching circuit element;
   converting said captured input strobe signal to a change of state of an output signal of said first latching circuit element;
   aligning the output signal of the first latching circuit element with the clock signal; and
   generating an output pulse signal in synchronism with said aligned signal, said output pulse signal having pulses that are approximately one clock cycle in duration.

7. Apparatus for synchronizing an asynchronous input strobe signal to a system clock signal, comprising:
   capture means, having first and second states, asynchronously responsive to said input strobe signal for translating said input strobe signal to a transition between the first and second states;
   synchronizing means, coupled to the capture means, for translating the change in state by said capture means into a change in state synchronized to said system clock signal; and
   means responsive to said synchronized state change for generating a pulse signal having a transition which has a substantially fixed delay with respect to a transition of said system clock signal.

8. Apparatus, for use in synchronizing an asynchronous input signal to a periodic clock signal, comprising:
   a first latching element for producing a state-change signal which changes between first and second states in synchronism with said asynchronous input signal;
   a second latching element, responsive to said clock signal, for synchronizing the state-change signal with the clock signal;
   a sequential logic circuit coupled to said second latching element and responsive to said clock signal for generating an output pulse signal for each change of state of the synchronized output signal provided by said second latching element.

* * * * *